(12) United States Patent
Wech

(10) Patent No.: US 8,157,243 B2
(45) Date of Patent: Apr. 17, 2012

(54) INSERT MOLDED EVACUATION VALVE

(75) Inventor: Michael J. Wech, Manitowoc, WI (US)

(73) Assignee: Oil-Rite Corporation, Manitowoc, WI (US)

(*) Notice: Subject to any disclaimer, the term of this patent is extended or adjusted under 35 U.S.C. 154(b) by 884 days.

(21) Appl. No.: 12/283,703

(22) Filed: Sep. 15, 2008

(65) Prior Publication Data
US 2009/0071553 A1    Mar. 19, 2009

Related U.S. Application Data

(60) Provisional application No. 60/994,144, filed on Sep. 17, 2007.

(51) Int. Cl.
*B22D 41/16* (2006.01)

(52) U.S. Cl. ...... 251/356; 251/30.05; 251/46; 251/61.1; 137/528

(58) Field of Classification Search .............. 251/30.05, 251/46, 61.1, 356; 137/528
See application file for complete search history.

(56) References Cited

U.S. PATENT DOCUMENTS

| | | | |
|---|---|---|---|
| 4,251,048 A * | 2/1981 | Aurell | 251/30.05 |
| 4,784,578 A | 11/1988 | Gruett | |
| 4,784,584 A | 11/1988 | Gruett | |
| 5,533,706 A * | 7/1996 | Aurell | 251/30.05 |
| 5,961,299 A | 10/1999 | Gruett et al. | |
| 5,984,652 A | 11/1999 | Gruett et al. | |
| 6,071,097 A | 6/2000 | Gruett et al. | |
| 6,099,270 A | 8/2000 | Wech | |
| 6,164,924 A | 12/2000 | Gruett et al. | |
| 7,118,352 B2 | 10/2006 | Gruett et al. | |

* cited by examiner

*Primary Examiner* — Steven J Ganey
(74) *Attorney, Agent, or Firm* — Ryan Kromholz & Manion, S.C.

(57) ABSTRACT

An evacuation valve for a metering device for a liquid medium is disclosed. The valve includes a seal holder having a chamber formed therein and a seal. An elastomeric material fills the chamber to form the seal. The seal includes a smooth, flat sealing surface located above the seal holder. The inclusion of a lip in the chamber retains the seal; a non-circular lip prevents rotation of the seal.

6 Claims, 4 Drawing Sheets

INSERT MOLDED EVACUATION VALVE

RELATED APPLICATIONS

This application claims the benefit of co-pending U.S. Provisional Patent Application No. 60/994,144, filed 17 Sep. 2007.

BACKGROUND OF THE INVENTION

This invention relates generally to metering devices for the precision feeding of a liquid medium, even in relatively small or minute quantities. Specifically, the invention relates to the construction of the evacuation valve for such metering devices.

Petroleum-based and synthetic lubricants, such as oil, are among the many liquids that are at times metered to machinery. In a given instance, the feeding of too little oil may place a machine at risk for excessive wear, damage or even catastrophic failure. However, too much oil may contaminate the product being manufactured and/or contribute to pollution and waste. Thus, accuracy in the metering of lubricants can be very important.

One such metering device is commercially known as the PURGEX® injector pump. The present invention comprises an improvement in such metering devices, including those described and claimed in U.S. Pat. Nos. 4,784,578, 4,784,584 and 7,118,352, each incorporated herein by reference.

These metering devices include an evacuation valve. The evacuation valve typically consists of a machined seal holder, or sealing block carrier and a seal in the form of a sealing block insert molded within the confines of an open chamber of the sealing block carrier. A portion of the seal protrudes from the seal holder to provide a critical sealing surface. In the past, the seal has been cut from sheet stock material and then affixed to the seal holder with adhesive. This construction has many drawbacks.

The primary drawback has been the inconsistency of the surface finish on the sheet material. Sheet material is likely to come from different suppliers and be handled in different manners during transport. If the surface finish is too rough, a poor seal will be provided by the evacuation valve. Furthermore, during the cutting process, great care must be taken to insure that the resulting seal is flat and that the seal edges are unobstructed and substantially perpendicular to the seal surface. If the edges are tapered or convex, the seal is likely to function poorly. The cutting process often generates debris that must be removed before the gluing process. In addition, the seal must be further cleaned to remove any oils or other contaminates, again prior to the gluing process. The selected adhesive used to join the seal with the seal holder must be compatible with the lubricant or fluid that will be dispensed through the metering device. Selecting an incompatible adhesive will ultimately lead to valve failure.

During the gluing process, great care must be taken again to insure that none of the glue is dispensed upon or makes contact with the seal surface. Further, it is important to insure that the seal is properly positioned and centered within the seal holder, or carrier. As can be appreciated, the entire process is quite labor intensive and requires multiple inspections of the parts prior to and during assembly.

The present invention overcomes these shortcomings by providing an evacuation valve that is insert molded. As described herein, the resulting valve is more economical to produce, has a superior sealing surface, and will provide a longer service life.

SUMMARY OF THE INVENTION

The invention resides in a metering device for a liquid medium which comprises a housing having an inlet and an outlet for the liquid medium. A cylinder is disposed in a housing. The housing has an open end that communicates with a housing outlet. An evacuation valve is provided in the housing and is biased (typically by a spring) to close the open end of the cylinder. A piston is operatively disposed in the cylinder and forms therewith a metering chamber ahead of the piston. Means are provided to conduct the liquid medium from the inlet to the metering chamber. Means are further provided to drive the piston forwardly through a working stroke thereby forcing the liquid medium in the metering chamber out of the chamber and past the evacuation valve toward the housing outlet. The piston breaks the plane of the open end of the cylinder on each working stroke to generally preclude entrapment of air in the metering chamber and thus provide for more accurate metering of the liquid medium, even in minute quantities.

The insert molded evacuation valve of the present invention includes two primary components, a seal holder, or carrier, and a seal in the form of a seal block molded with an exposed cavity or chamber preformed with the carrier and having a portion thereof extending beyond the seal carrier. The seal holder is formed from a strong, durable material such a metal or plastic. The seal is formed from a softer, pliable material such as rubber. The portion of the seal that extends beyond the seal holder forms a critical seal surface.

The seal holder, or carrier, includes a body having an outer periphery, an open chamber and axial through hole. The outer periphery of the carrier fits within the lower end of the housing as described above. The open chamber includes a flanged, inwardly extending lip which bisects the chamber wall and forms an annular recess, or cavity, below the lip. The through hole provides an opening to inject the seal material into the seal holder, or carrier, as will be described.

The seal holder is placed within a die for the formation of the seal. The die, which includes a first die half and a second die half, has a cylindrical void located above the seal holder. The portion of the die void that forms the sealing surface is highly polished and oriented substantially parallel with the upper, exposed surface of the seal holder. Liquid seal material, such as rubber, is injected into the axial through hole in the seal holder. The material fills the open chamber in the seal holder and including the void in the die. As the material flows around the flanged lip in the open chamber and solidifies, the seal is securely retained in the seal holder, or carrier. In a preferred embodiment, the lip has a hexagonal configuration, thereby further preventing rotation of the seal block within the seal holder, or carrier. Once solidified, the die halves are separated and the completed evacuation valve is removed. The polished surface within the die provides a superior sealing surface on the seal portion, or block, of the evacuation valve.

DESCRIPTION OF THE PREFERRED EMBODIMENT

Although the disclosure hereof is detailed and exact to enable those skilled in the art to practice the invention, the physical embodiments herein disclosed merely exemplify the invention that may be embodied in other specific structure. While the preferred embodiment has been described, the details may be changed without departing from the invention.

Figure 1:
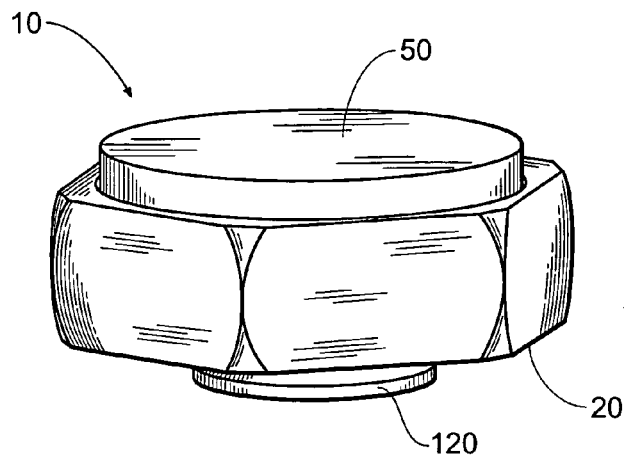
FIG. 1 is a perspective view of a prior art evacuation valve.
Figure 2:
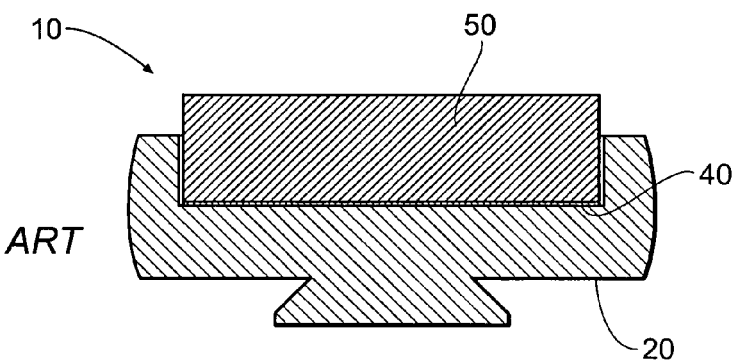
FIG. 2 is cross-sectional view of the prior art evacuation valve shown in FIG. 1.
Figure 3:
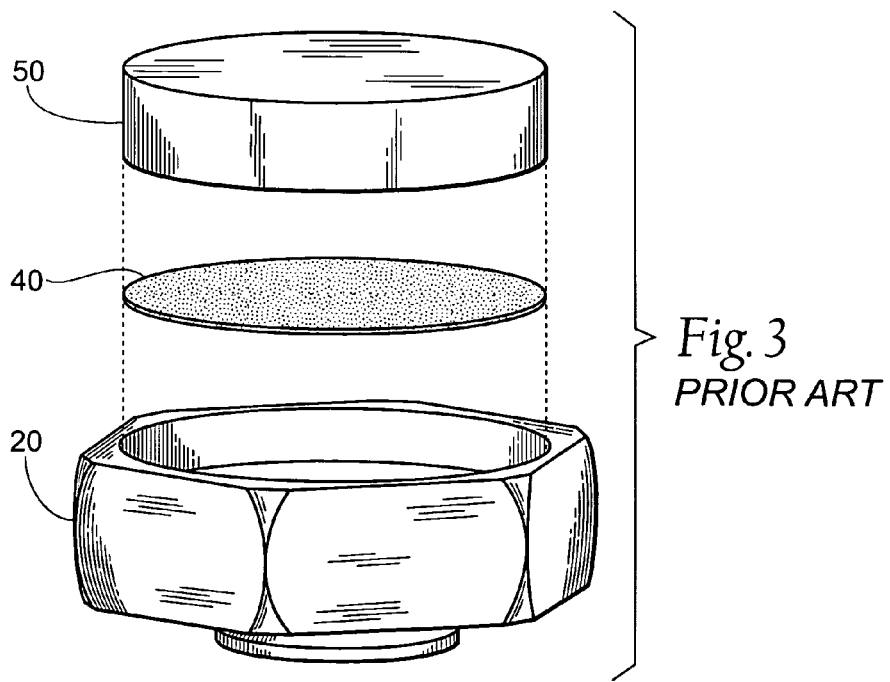
FIG. 3 is an exploded perspective view of the prior art evacuation valve shown in FIG. 1.

Referring to the drawings, wherein like numerals represent like parts throughout the views, the prior art design is shown in FIGS. 1 through 3. A pertinent prior art evacuation valve 10 includes a seal holder, or carrier 20 and a seal 50. In the prior art design, the seal is cut from sheet stock material. This is accomplished by any of a variety of operations such as punching, die cutting or circular cutting. As shown in FIGS. 2 and 3, the cut seal 50 is then affixed to the seal holder 20 with an adhesive 40. The resulting evacuation valve 10 is shown in FIG. 1.

Figure 7:
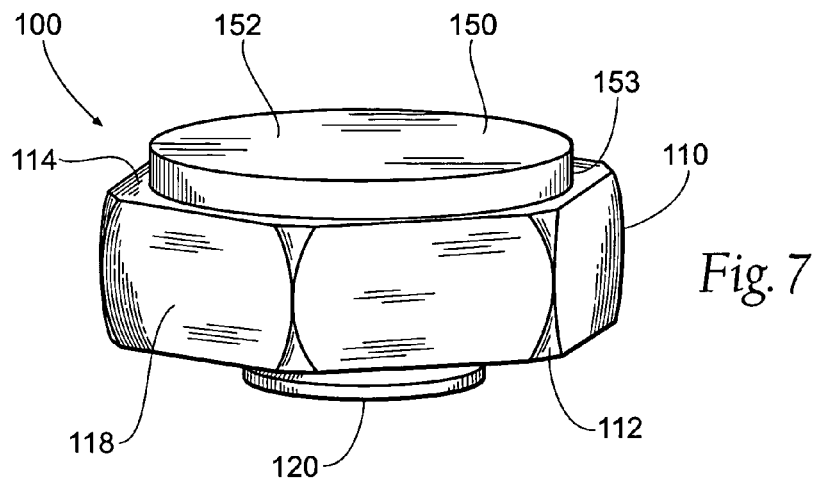
FIG. 7 is a perspective view of the evacuation valve of the present invention.
Figure 8:
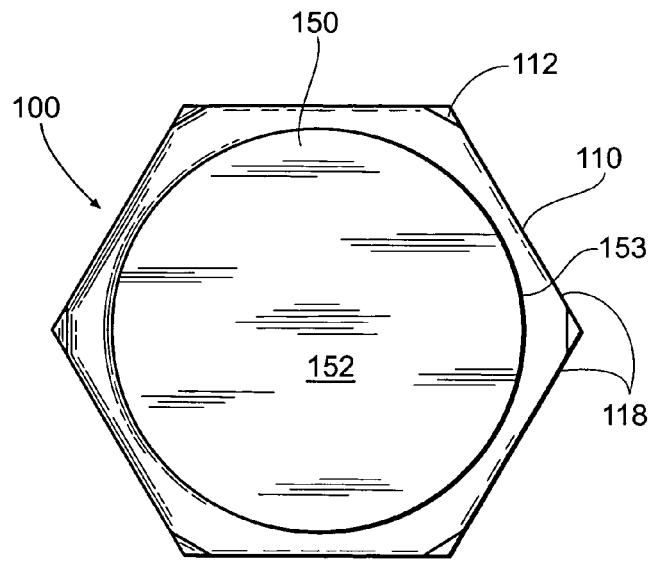
FIG. 8 is a top plan view thereof.

The present invention, as depicted in FIG. 7, features an improved insert molded evacuation valve, will be referred to by reference numeral 100. The evacuation valve 100 includes a seal holder, or carrier 110 having a seal in the form of a seal block 150 molded therein.

Figure 4:
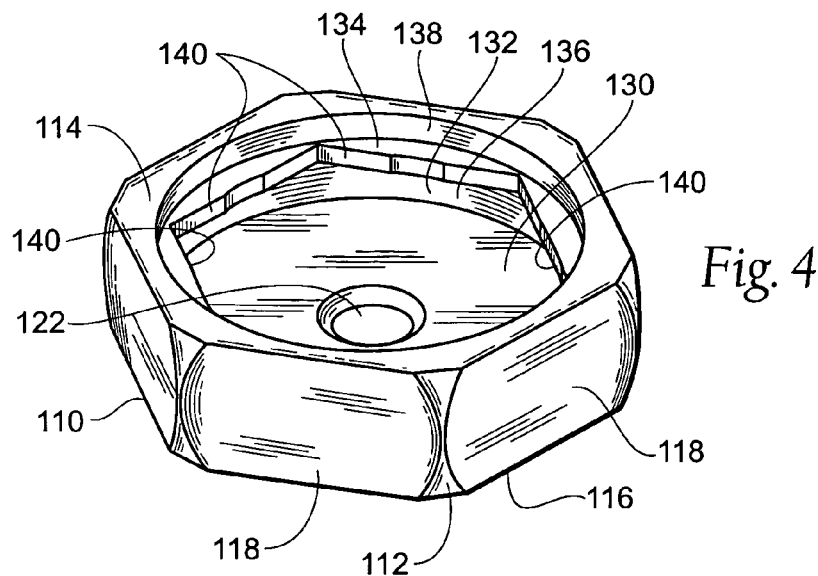
FIG. 4 is a perspective view of the seal holder of the present invention.
Figure 5:
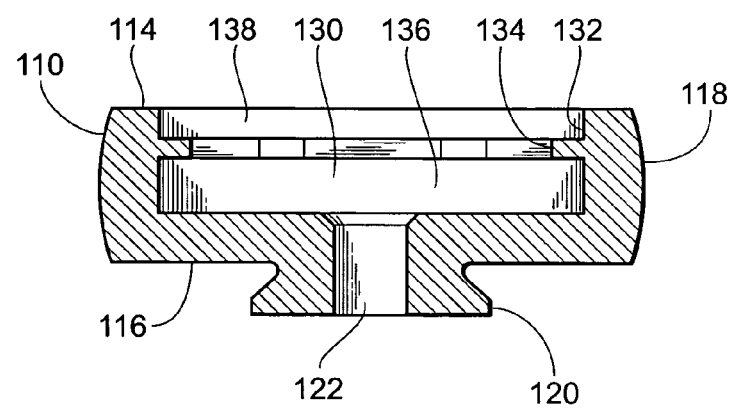
FIG. 5 is a cross sectional view thereof.
Figure 6:
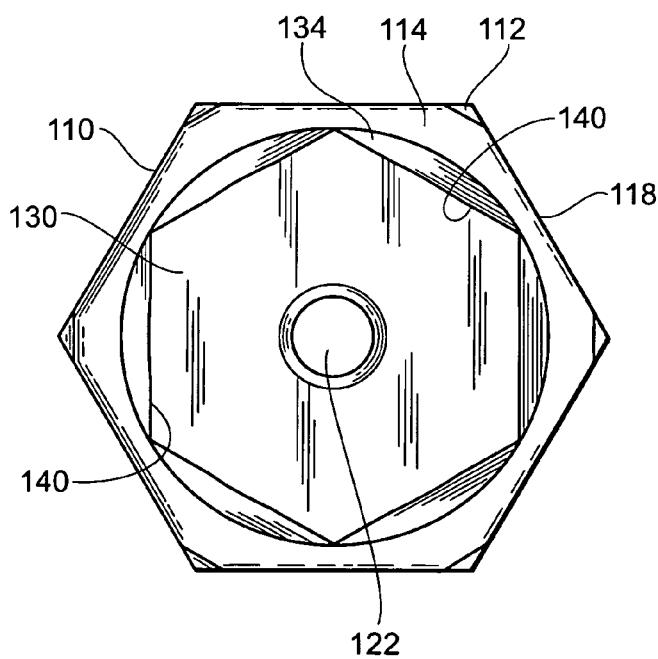
FIG. 6 is a top plan view thereof.

Referring to FIGS. 4-6, the seal holder 110 is preferably formed from brass; however it is to be understood that it could be formed from any sufficiently stiff and rigid material including either metals or plastics. In the preferred embodiment, the seal holder 110 is preferably formed from ⅜ inch hex bar stock. The conventional bar stock is first turned in a lathe. This process is intended to "break" or round the corners 112 of the hex bar stock material. This eases the insertion and removal of the seal holder 110 in the die halves 212 and 214 discussed below as well as prevents the binding of the seal holder 110 if it should become out of axial alignment in a cylindrical bore. The resulting body has a first topside 114, a second underside 116 and side walls 118. While the seal holder 110 is shown to be hexagonal in shape, it is to be understood that it could have any geometric shape. Next, a spring retaining structure 120, substantially identical to that of the prior art design, is formed on side 116 of the seal holder, or carrier 110. As best shown in FIG. 5, a through hole 122 is drilled through the seal holder 110 along its central axis. An open chamber, or cavity 130 is formed in the holder 110 on the side opposite an integrally formed, radially extending spring retainer 120. Cavity 130 includes a circumferential cavity wall 132 bisected by an integrally formed, flanged lip 134. The lip 134 is formed about the wall 132 thereby defining an inner cavity 136 and an outwardly facing cavity 138. The inner marginal edge 140 of the lip 134 may have any geometric shape. In a preferred embodiment, the lip 134 has a hexagonal shape 140 as best shown in FIGS. 4 and 6. The cavity 130 and hexagonal lip 134 are preferably formed by a broaching process. By utilizing a hexagonally shaped lip, the chips of cut away material can be easily dispelled from the seal holder 110 during the cutting or broaching process as the broaching tool enters inner cavity 136.

Figure 9:
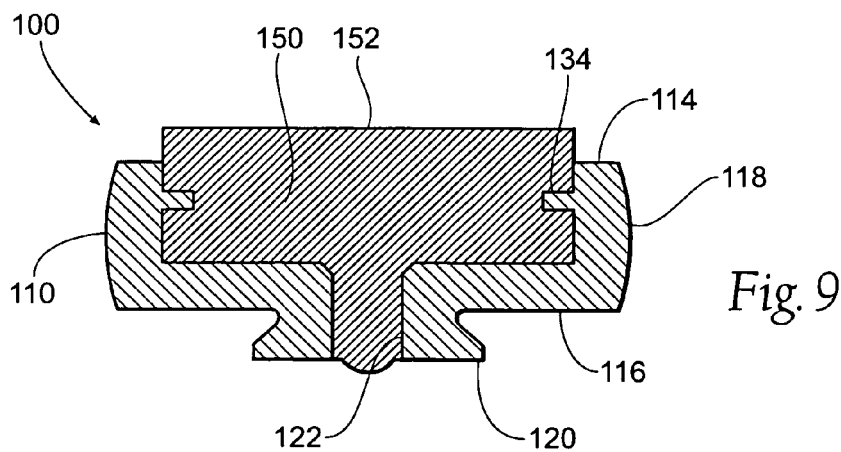
FIG. 9 is a cross-sectional view thereof.

Unlike the prior art, the seal 150 is molded within the cavity 132, as opposed to being adhered within the cavity. The formed seal, or seal block 150 is retained from removal by the flanged lip 134. The inclusion of a non-circular lip, such as hexagonally formed lip 134, prevents rotation of the seal block 150 within the holder, or carrier 110. As shown in FIGS. 7 and 9, the seal block 150 includes a circular planar sealing surface 152. It is imperative that the sealing surface 152 be smooth, flat and substantially perpendicular to the seal block, longitudinally extending periphery 153.

Figure 10:
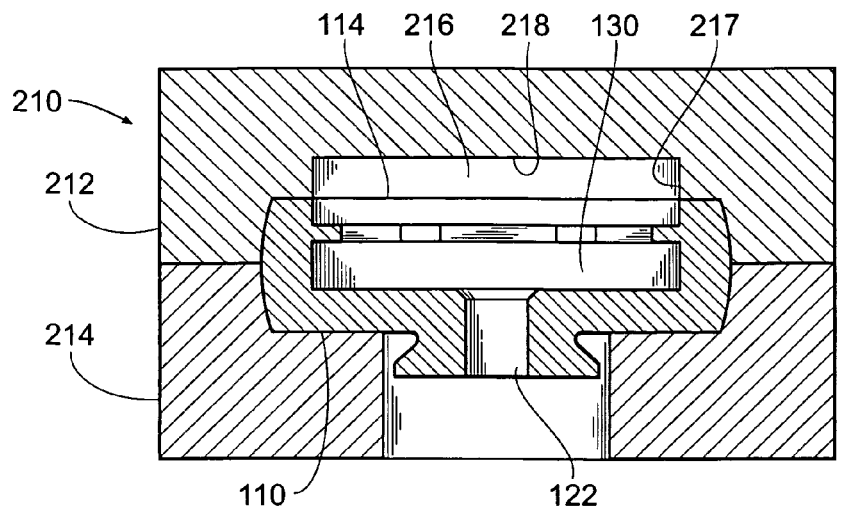
FIG. 10 is a cross sectional view of the seal holder placed within a die.
Figure 11:
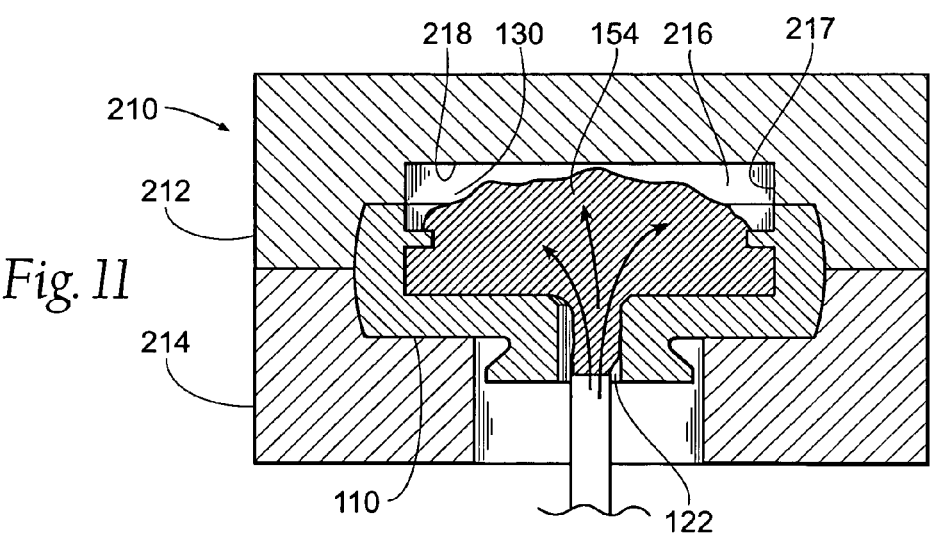
FIG. 11 is a cross sectional view of the rubber material flowing through the seal holder and into the die.
Figure 12:
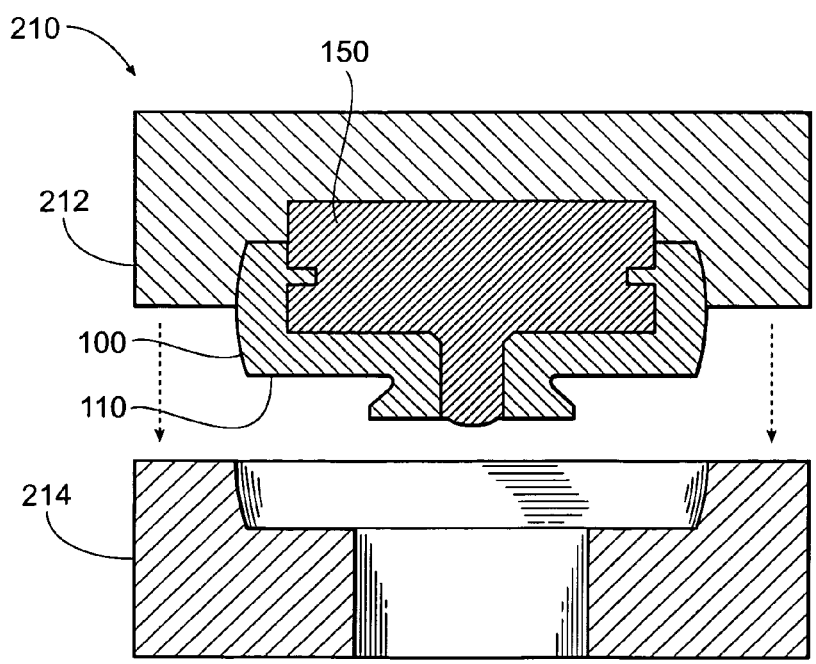
FIG. 12 is a cross sectional view of the evacuation valve just prior to its removal from the die.

Toward this end, and referring to FIGS. 10-12, the seal block 150 is formed within the open cavity, or open chamber 130 of the seal holder, or carrier 110 by first placing the seal holder 110 in a die 210. The die 210 has a first half 212 and a second half 214. When the die halves 212, 214 are closed around the seal holder 110, an open void 216 is formed above top surface 114 of the prepositioned seal carrier 110. The uppermost surface portion 218 and the peripheral surface 217 of the void 216 are each polished to a mirror-like finish to provide the desired smooth and flat sealing surfaces 152 and 153. The relationship of the holder 110 to portion 218 is accurately controlled so that the resulting seal surface 152 is perpendicular to the peripheral surface 153 of the holder, or carrier 110.

Referring specifically to FIG. 11, liquid seal material 154 is injected through opening 122. The liquid seal material 154 fills both cavity 130 and void 216. When the material 154 has sufficiently solidified, the dies halves 212, 214 are separated and the completed evacuation valve 100, including the seal holder 118 and seal block 150, is removed.

The seal material can be selected from any suitably soft, pliable material such as rubber or a synthetic material. Suitable synthetic materials are sold under the trade names of BUNA, VITON, EPDM, HNBR, CHEMRAZ and KALREZ. However any suitable elastomeric material may be used.

The resulting evacuation valve 100 has many advantages over the prior art design including the following. Because surface 218 in die half 212 is polished to a mirror-like state, the resulting seal surface 152 will be smooth and flat. Furthermore, this critical surface will be free from contamination such as adhesive or debris. Because seal holder 110 is securely and positively positioned within die halves 212, 214, the resulting sealing surface 152 will be substantially perpendicular to the holder's side walls 118 and the seal 150 will be properly centered and positioned within the seal holder 110. The presence of the integrally formed lip 134, coupled with the flow of liquid seal material 154 into the inner cavity 136, and specifically into the portion of the inner cavity 136 that resides beneath the lip 134, prevents the removal of seal 150. The non-circular, or in the preferred embodiment hexagonal shape of the inner margin 140 of the lip 134 prevents the rotation of seal 150 within holder 110.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention.

I claim:

1. An evacuation valve for a liquid medium metering device comprising an insert molded seal and seal holder unit, wherein:

said seal holder unit consists of a cup-like body having an outer surface, said seal holder unit defining an open chamber and an axial through hole communicating with said open chamber for passage of an injectable seal-forming pliable material, said open chamber including an inwardly extending, flanged lip dividing said open chamber into axially spaced inner and outer cavities;

said seal being formed upon injection of said injectable seal-forming pliable material into an inner surface of the open chamber of said seal holder unit, to thereby provide said evacuation valve having said seal holder unit, wherein said seal is formed of said seal-forming pliable material restrained from axial and rotational movement relative to the inner surface of said open chamber of said seal holder unit and said flanged lip.

2. The evacuation valve of claim 1, wherein the seal and seal holder unit includes an external portion of the molded seal extending axially outwardly of the open chamber of said seal holder unit, said external portion being formed with a non-interrupted surface finish free from surface contamination and debris.

3. The evacuation valve of claim 1, wherein the innermost peripheral margin of said flanged lip is of non-cylindrical configuration providing rotational restraint of said seal molded within and conforming to the inner surfaces of said spaced apart inner and outer cavities.

4. The evacuation valve of claim 3, wherein the innermost peripheral margin of said flanged lip is of polygonal configuration.

5. The evacuation valve of claim 3, wherein the innermost peripheral margin of the flanged lip is hexagonal.

6. The evacuation valve of claim 1, wherein said outer surface of said seal holder unit is formed from hexagonal bar stock with each of its apices being broken to provide ease in insertion and removal into and from said open chamber.

* * * * *